H. C. VIZENTS.
ELECTRIC SECONDARY CLOCK.
APPLICATION FILED SEPT. 21, 1908.

909,732.

Patented Jan. 12, 1909.

2 SHEETS—SHEET 1.

Witnesses:
John Enders
Chas. H. Buell

Inventor:
Herman C. Vizents
By Dyrenforth, Lee, Chritton & Wiles
Attys.

H. C. VIZENTS.
ELECTRIC SECONDARY CLOCK.
APPLICATION FILED SEPT. 21, 1908.
909,732.
Patented Jan. 12, 1909.
2 SHEETS—SHEET 2.
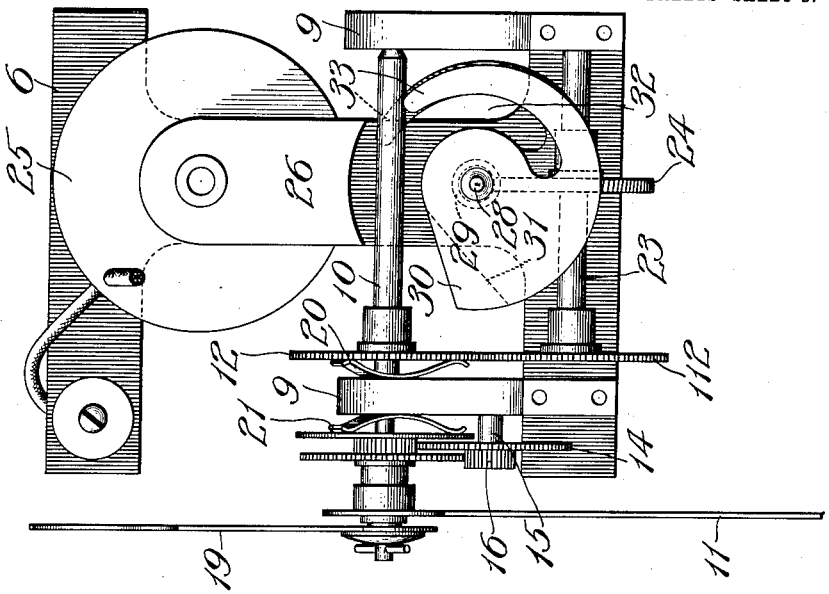
Witnesses:
John Enders
Chas. H. Buell
Inventor:
Herman C. Vizents
By Dyrenforth, Lee, Chritton & Wiles
Attys.

UNITED STATES PATENT OFFICE.

HERMAN C. VIZENTS, OF CHICAGO, ILLINOIS, ASSIGNOR, BY MESNE ASSIGNMENTS, TO TOM McNAUGHTON, OF LONDON, ENGLAND.

ELECTRIC SECONDARY CLOCK.

No. 909,732.    Specification of Letters Patent.    Patented Jan. 12, 1909.

Application filed September 21, 1908. Serial No. 453,901.

*To all whom it may concern:*

Be it known that I, HERMAN C. VIZENTS, a citizen of the United States, residing at Chicago, in the county of Cook and State of Illinois, have invented a new and useful Improvement in Electric Secondary Clocks, of which the following is a specification.

The primary object of my invention is to provide a construction of electric secondary clock which shall render its operation noiseless and thus avoid the usual clicking sound emitted in actuating the hands from a master-clock, which is particularly objectionable in private rooms, especially hotel and office rooms, where such secondary clocks are installed.

Figure 1:
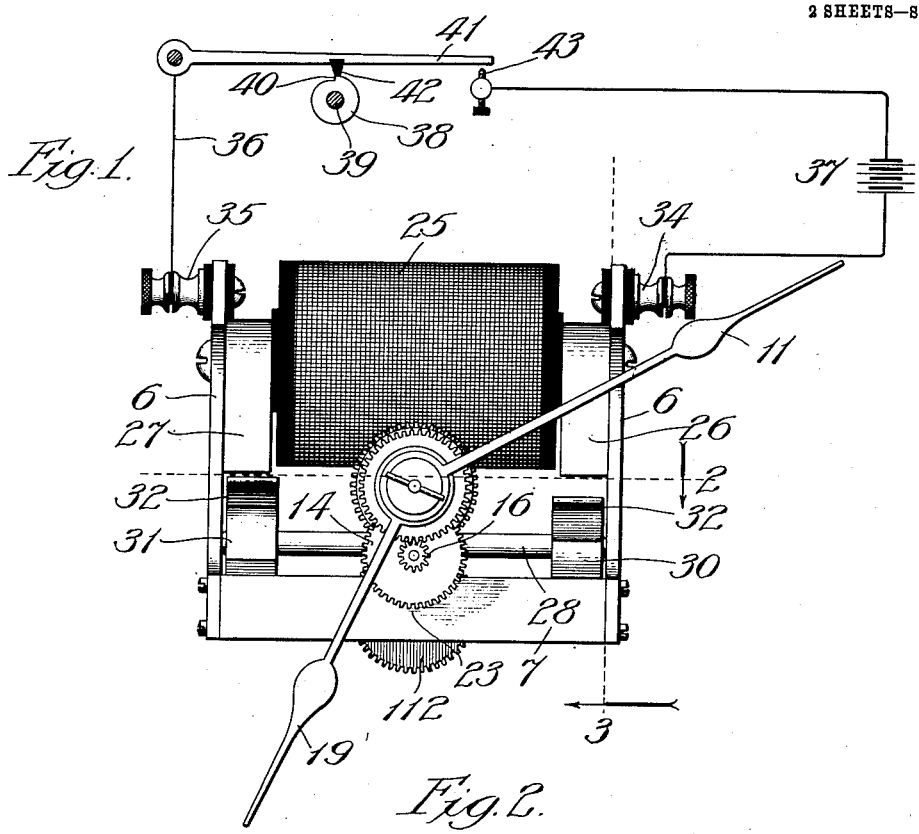
Figure 2:
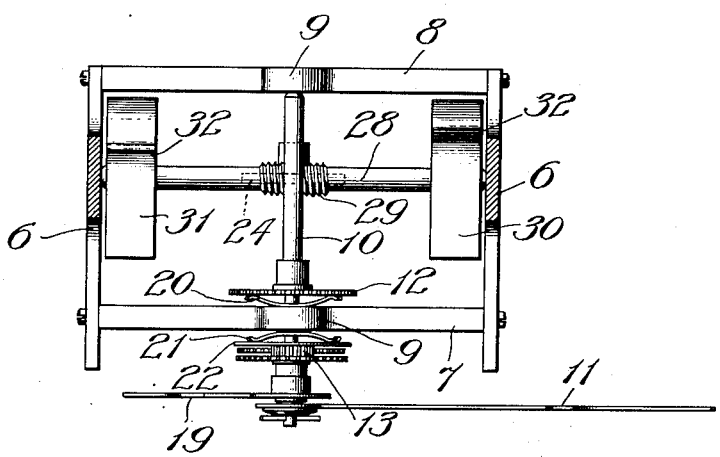

In the accompanying drawings, Figure 1 is a view of the improved mechanism in front elevation with its actuating electro-magnet in the circuit of electric controlling mechanism therefor of a master-clock shown diagrammatically; Fig. 2 is a plan section on line 2, Fig. 1; Figs. 3 and 4 are enlarged sections on line 3, Fig. 1, respectively showing the rotary armatures in their attached and normal or released positions, and Fig. 5 is a section on line 5, Fig. 3.

A metal frame supporting the mechanism is shown to consist of similar side-members 6 of general I-shape with forward and rear bearing-bars 7 and 8 connecting them at their lower-head portions and each provided, midway between its ends, with an upright bearing-finger 9. In these fingers is journaled the shaft 10 carrying the minute-hand 11 and, behind the forward bearing-finger, the gear-wheel 12 of the clock-train for driving the minute-shaft. The clock-train involves the usual gears comprising, in addition to the wheel 12, a pinion 13 on the minute-hand shaft meshing with a gear 14 on a sleeve 15 rotatably supported beneath the projecting end of that shaft on the forward bearing-finger 9, and the gear 14 carrying a pinion 16 to mesh with the gear 17 on a sleeve 18 loosely surrounding the minute-hand shaft and carrying the hour-hand 19. For the purpose hereinafter explained, a spring 20 on the shaft 10 is confined by the forward bearing-finger 9 against the adjacent face of the wheel 12; and a similar spring 21 is confined between the opposite side of the same finger and a disk 22 loose on the shaft and abutting against the pinion 13 to exert tension on the minute-hand to hold it in any set position.

A shaft 23 is journaled in the bearing-bars 7 and 8 to extend directly underneath the shaft 10, and carries near its forward end a gear-wheel 112 like and meshing with the wheel 12, and a worm-wheel 24. An electro-magnet 25, shown as a single spool, extends between and rigidly connects the side-members 6 near their upper-head portions and has rigid pole-pieces 26 and 27 depending from the opposite ends of its core between the ends of the spool and the side-members of the frame; and the lower ends of these pole-pieces are concaved in arc-shape. A shaft 28 is journaled in the frame-members 6 to extend below and parallel with the electro-magnet and transversely of the shaft 23, and it is provided with a worm 29 (Fig. 2) to mesh with the worm-wheel 24. Similar armatures 30 and 31 are carried by the shaft 28 near its opposite ends to register, respectively, with the pole-pieces 26 and 27. The armatures are eccentrically mounted on the shaft to overbalance them and thereby cause them to tend to seek their normal positions by gravity, when released by deënergization of the electro-magnet. To this end the preferred form of each armature is that shown of a disk with a sector-shaped section removed; and to further lighten it, an arc-shaped section is cut out of it, forming a curved slot 32 extending from near one end of the flat portion of the periphery about half-way to the opposite end of that portion.

It is preferred, for the purpose hereinafter explained, to set the armatures, for the normal positions thereof, shown in Fig. 4, with the advance-end of the tongue 33 of one, as the armature 31, formed by its slot, slightly overlapping the adjacent edge of the pole-piece 26, and the corresponding end of the similarly formed tongue 33 of the other armature slightly separated from the adjacent edge of the pole-piece 27 to be out of the field of attraction of the electro-magnet.

For energizing the magnet 25 it is included, at binding-posts 34 and 35 on the side-members 6, in the circuit 36 of an electric-current generator conventionally represented at 37 in Fig. 1. The circuit includes a contact making and breaking device in a master-clock (not shown), any suitable construction of which may be provided, that shown consisting of a circular cam-like head 38 on the minute-shaft 39 of the master-clock and provided with a peripheral shoulder 40, and a pivotal contact-finger 41 having a depending stud 42 riding on the cam-head to normally maintain that finger out of engagement with a contact-point 43 and thus maintain the circuit open until momentarily closed in each rotation of the shaft 39 by the shoulder 40 clearing the stud 42 and permitting the latter to drop and contact the finger with the point 43.

It will be observed that my improvement avoids the use of any pawl and ratchet or other form of mechanism usually employed for gear actuating or locking purposes, or both, in electric secondary clocks, and to which the objectionable clicking, referred to, is mainly due; and that there is no element used in my improved construction tending to defeat its primary object of rendering the clock noiseless.

The operation is as follows: Each time the circuit is closed by the master-clock to energize the electromagnet 25 the latter first attracts the armature 31, which is in the field of attraction, thereby rotating the shaft 28 and bringing the armature 30 into the field of attraction. The resistance to turning the armature-shaft is least at the start, but increases as the heavier parts of the armatures rise, so that less current is required at the instant of starting the armature-turning, and the power for this purpose is sufficiently exerted at the one pole-piece 27; but as the resistance increases the second armature 30 is brought into the field of the pole-piece 26, which thereafter supplements the power of the other pole-piece. By this arrangement a material saving ensues in the consumption of battery-current. With the armature rotated to the positions respectively shown by their full and dotted representations in Fig. 3, the circuit is opened and their centers of gravity have passed over the center of the shaft 28, when their own gravity continues their rotation to the normal positions, wherein their centers of gravity are lowermost. Thus the shaft 28 is turned, with each energizing of the electromagnet through a complete rotation, turning with it the worm 29 to actuate the clock-train to move the hand 11 through a minute-space on the clock-dial (not shown). However, the inertia of the overbalanced armatures in thus falling by their own gravity will carry them slightly beyond the aforesaid normal positions, thereby turning the worm-shaft through more than a complete rotation, and accordingly turning the minute-hand beyond such minute-space; but since the armatures act in this way each time they operate there will not ensue from this cause excessive turning of the hand after the first operation, after which the hand may be set back to register properly with the end of the minute-space traversed by it, so that each successive operation of the armatures shall accurately register the minute-hand with the end of a successive minute-space. But the armatures, being thus carried around unduly by their momentum, in seeking to come to rest under the force of gravity necessarily oscillate slightly and correspondingly oscillate the worm-shaft. This, however, is without effect on the clock-train because of a slight lost motion provided for between the gears 12 and 112, which is sufficient, as indicated in Fig. 5, to enable the gear 112 to take it up without disturbing the gear 12. The spaces between the intermeshing teeth of these two last-named gears, represented in Fig. 5 and permitting the lost-motion referred to, tend to cause the gear 112, in starting to turn, to pound or jar the gear 12, but this is prevented by the spring 20, which, by resiliently holding the gear 12, resists any tendency to irregularity of its movements under such pounding. The worm-gear drive of the train accomplishes, as an important function thereof, that of locking the clock-train between its intermittent movements.

What I claim as new and desire to secure by Letters Patent is—

1. In an electric secondary-clock movement, the combination with a frame and a hand-shaft journaled therein, of a worm-gear for turning said shaft, said gear including a worm-shaft an electromagnet provided with means for including it in an electric circuit, and an overbalanced armature on the worm-shaft coöperating with a pole of the electromagnet under its attractive force to partially rotate said shaft and operating by its own gravity to complete the rotation thereof, for the purpose set forth.

2. In an electric secondary-clock movement, the combination with a frame and a hand-shaft journaled therein, of a clock-train for turning said shaft having lost motion between gears therein, a worm-gear for driving said train, said gear including a worm-shaft an electromagnet provided with means for including it in an electric circuit, and an overbalanced armature on the worm-shaft coöperating with a pole of the electromagnet under its attractive force to partially rotate the worm-shaft and operating by its own gravity to complete the rotation thereof, for the purpose set forth.

3. In an electric secondary-clock movement, the combination with a frame and a hand-shaft journaled therein, of a clock-train for turning said shaft including a spring-pressed gear having lost motion, a worm-gear for driving said train, said gear including a worm-shaft an electromagnet provided with means for including it in an electric circuit, and an overbalanced armature on the worm-shaft coöperating with a pole of the electromagnet under its attractive force to partially rotate the worm-shaft and operating by its own gravity to complete the rotation thereof, for the purpose set forth.

4. In an electric secondary-clock movement, the combination with a frame and a hand-shaft journaled therein, of a worm-gear for turning said shaft, said gear including a worm-shaft an electromagnet supported above said gear and provided with means for including it in an electric circuit and having a depending pole-piece, and an overbalanced armature on the worm-shaft coöperating with said pole-piece above it under the attractive force of the electromagnet to partially rotate said worm-shaft and operating by its own gravity to complete the rotation thereof, for the purpose set forth.

5. In an electric secondary-clock movement, the combination with a frame and a hand-shaft journaled therein, of a worm-gear for turning said shaft, said gear including a worm-shaft an electromagnet supported above said gear and provided with means for including it in an electric circuit and with a depending pole-piece having a concave lower end, and an overbalanced armature on the worm-shaft of circular form about a portion of its circumference and straight along the remainder thereof with a curved tongue-forming slot in the circular portion, for the purpose set forth.

6. In an electric secondary-clock movement, the combination with a frame and a hand-shaft journaled thereon, of a worm-gear for turning said shaft, said gear including a worm-shaft an electromagnet supported above said gear and provided with means for including it in an electric circuit, pole-pieces depending from the ends of the magnet-core and having concavely arc-shaped lower ends, and overbalanced armatures on the worm-shaft registering with said pole-pieces, said armatures being each of circular form about a portion of its circumference and straight along the remainder thereof with a curved tongue-forming slot in the circular portion, and being set on the worm-shaft with the tongue of one normally in the field of attraction of the adjacent pole-piece and the tongue of the other normally out of the field of attraction of the pole-piece adjacent to it, for the purpose set forth.

HERMAN C. VIZENTS.

In presence of—
  CHAS. E. GAYLORD,
  RALPH A. SCHAEFER.